US007088055B2

(12) United States Patent
Chen

(10) Patent No.: US 7,088,055 B2
(45) Date of Patent: Aug. 8, 2006

(54) HIGH EFFICIENCY CONTROLLER OF A GAS-FILLED LIGHT EMITTING TUBE

(76) Inventor: Owen Chen, 624 Pratt Ave., Schaumburg, IL (US) 60194

( * ) Notice: Subject to any disclaimer, the term of this patent is extended or adjusted under 35 U.S.C. 154(b) by 0 days.

(21) Appl. No.: 10/725,553

(22) Filed: Dec. 3, 2003

(65) Prior Publication Data
US 2005/0122061 A1  Jun. 9, 2005

(51) Int. Cl.
H05B 37/02 (2006.01)

(52) U.S. Cl. .............. 315/224; 315/291; 315/225; 315/282; 315/209 R; 315/DIG. 7; 361/18; 361/38; 361/42

(58) Field of Classification Search .......... 315/307, 315/291, 209 R, 200 R, 212, 276, 224, 289, 315/DIG. 7, 225, 282; 363/21.01–21.18, 363/26, 34, 56.01, 56.07; 361/18, 35, 38, 361/42
See application file for complete search history.

(56) References Cited

U.S. PATENT DOCUMENTS

| 4,975,823 | A | * | 12/1990 | Rilly et al. ............ 363/21.16 |
| 5,030,887 | A | * | 7/1991 | Guisinger ................ 315/158 |
| 5,039,920 | A | * | 8/1991 | Zonis ...................... 315/291 |
| 5,499,154 | A | * | 3/1996 | Cullison .................... 361/18 |
| 5,629,588 | A | * | 5/1997 | Oda et al. ................ 315/308 |
| 6,034,485 | A | * | 3/2000 | Parra .................... 315/209 R |
| 6,104,585 | A | * | 8/2000 | Matsui et al. ............. 361/38 |
| 6,614,185 | B1 | * | 9/2003 | Nishimura et al. ....... 313/607 |

* cited by examiner

Primary Examiner—Haissa Philogene
(74) Attorney, Agent, or Firm—Rosenberg, Klein & Lee

(57) ABSTRACT

The present invention relates to a high-efficiency controller of a gas-filled light producing tube; the controller can produce signals in a form of outputs of high-frequency sine wave to soft-start a gas-filled light producing tube according to the principle of modulation and oscillation of pulse (P.W.M.) so that the gas-filled tube produces light, and that service light of the gas-filled tube can be lengthened. If abnormal conditions happen, e.g. people's touching the gas-filled tube, and the tube breaking, the controller will make the transformer stop working immediately, preventing sparks from being produced to hurt people, making the gas-filled light producing tube safe to use. 12 external switch circuit

6 Claims, 2 Drawing Sheets

HIGH EFFICIENCY CONTROLLER OF A GAS-FILLED LIGHT EMITTING TUBE

BACKGROUND OF THE INVENTION

1. Field of the Invention

The present invention relates to a high-efficiency controller of a gas-filled light producing tube, which can help a gas-filled light producing tube have long lifespan for using, and which can form an broken circuit automatically in case human body contacts the gas-filled tube or the gas-filled tube breaks; thus, it can present the best efficacy of using safely.

2. Brief Description of the Prior Art

Various artificial light sources play important roles in human daily living, not only providing illumination to people in the dark but also being used a lot for making different styles of advisements. Of various artificial light sources, various Gas-filled light producing tubes, provided with the interior gas-filled, are most common.

Conventional starters for gas-filled light producing tubes consist of steel plates made of silicon, which are provided for changing low-frequency alternative electric currents (50/60 Hz) passing through them into voltages as needed by a gas-filled light producing tube so that the tube can emit light. More recently, the high-frequency is used to make light producing tubes start emitting light, in which the low-frequency alternative current power source are rectified into the direct current power source, and then the high-frequency oscillation in the series connection or the harmonic-oscillating frequency circuit is used to achieve the purpose of starting light producing tubes.

However, the above-mentioned conventional ways of starting gas-filled light producing tubes have disadvantages that they are not satisfactorily stable and safe in substantially using because they are prone to cause high-voltage sparks when used, and their lifespan for using on the light producing tubes won't be satisfactorily long that are used with them.

SUMMARY OF THE INVENTION

It is a main object of the present invention to provide a high-efficiency controller to a gas-filled light producing tube for overcoming the disadvantages of the above conventional controller.

A controller according to the present invention includes a logic integrated circuit controlled and oscillated by the pulse width modulation, which drives by voltages or amplifies by push-pull power the inputted electric currents into signals in a form of outputs of high-frequency sine wave (1.414), then amplified and transformed into currents of voltages as needed by the load, i.e. a gas-filled light producing tube, by means of a power amplifier and a transformer. The controller is highly efficient and small in size, and will not become hot when working. Thus, the gas-filled tube can meet the efficacies of soft starting, controlling the amplification of power, adjusting the load automatically, examining the overload under abnormal conditions or the disconnection and electric shock of the output terminal; concurrently, the gas-filled producing tube provides with a longer lifespan for using.

It is another object of the present invention to provide a high-efficiency controller to a gas-filled light producing tube so that the tube is relatively safe to use; the controller has an overload protective circuit, which can make the controller stop working in case the load breaks or short-circuit happens so as to avoid the high voltage, sparks and electric shock.

The controller of the present invention includes a grounding protective circuit, which can make the controller stop working in case the output terminal of a transformer of the controller contacts the ground or human body comes into contact with the output terminal of the transformer so as to avoid sparks raised from the high voltage power hurting people and ensure the public security in using.

The controller of the present invention further includes an external switch circuit, which can be connected to various controlling device such as voice-controlled one, and light-controlled one to be more convenient to use.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
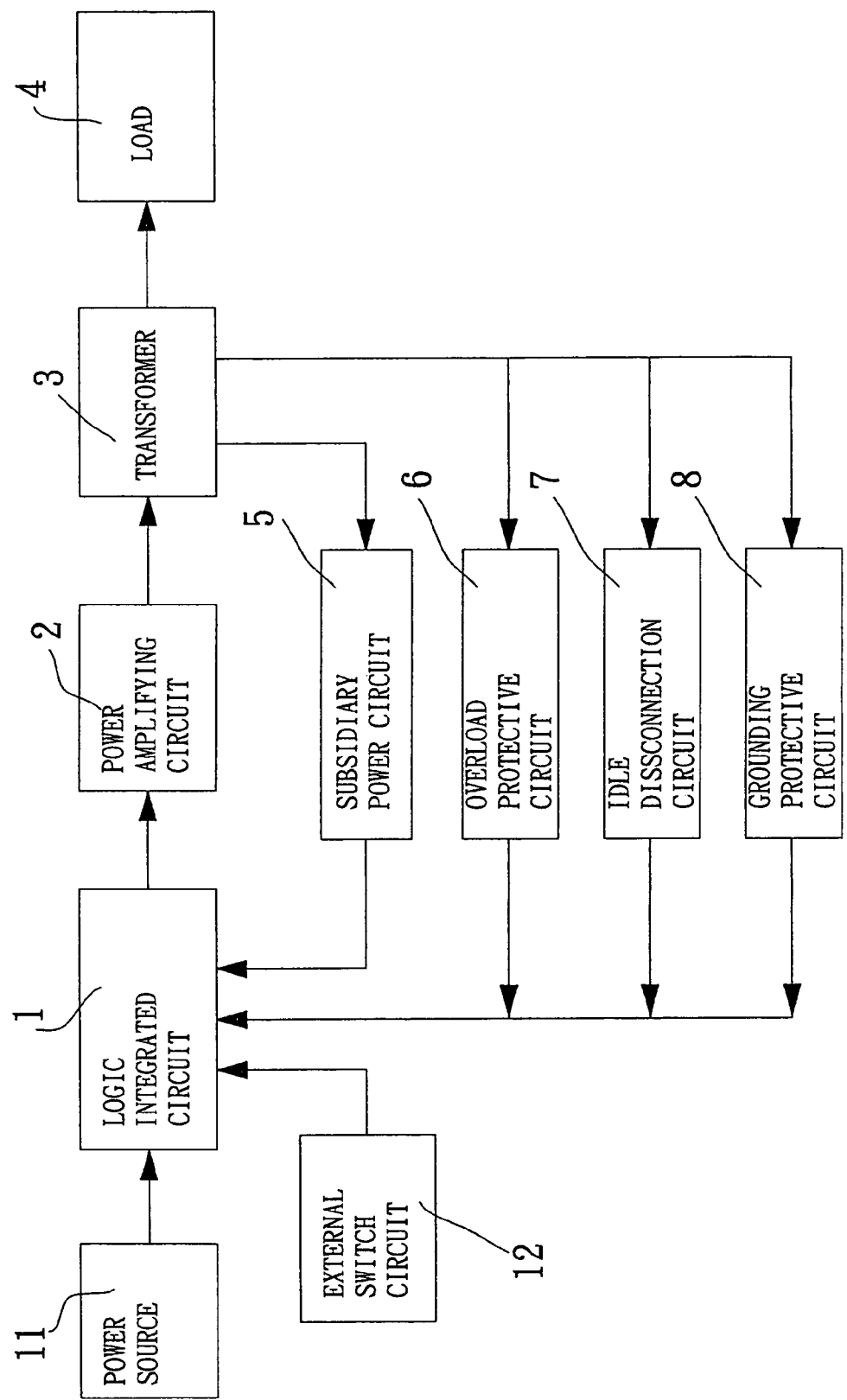
FIG. 1 is a block diagram of a high-efficiency controller of a gas-filled tube according to the present invention.
Figure 2:
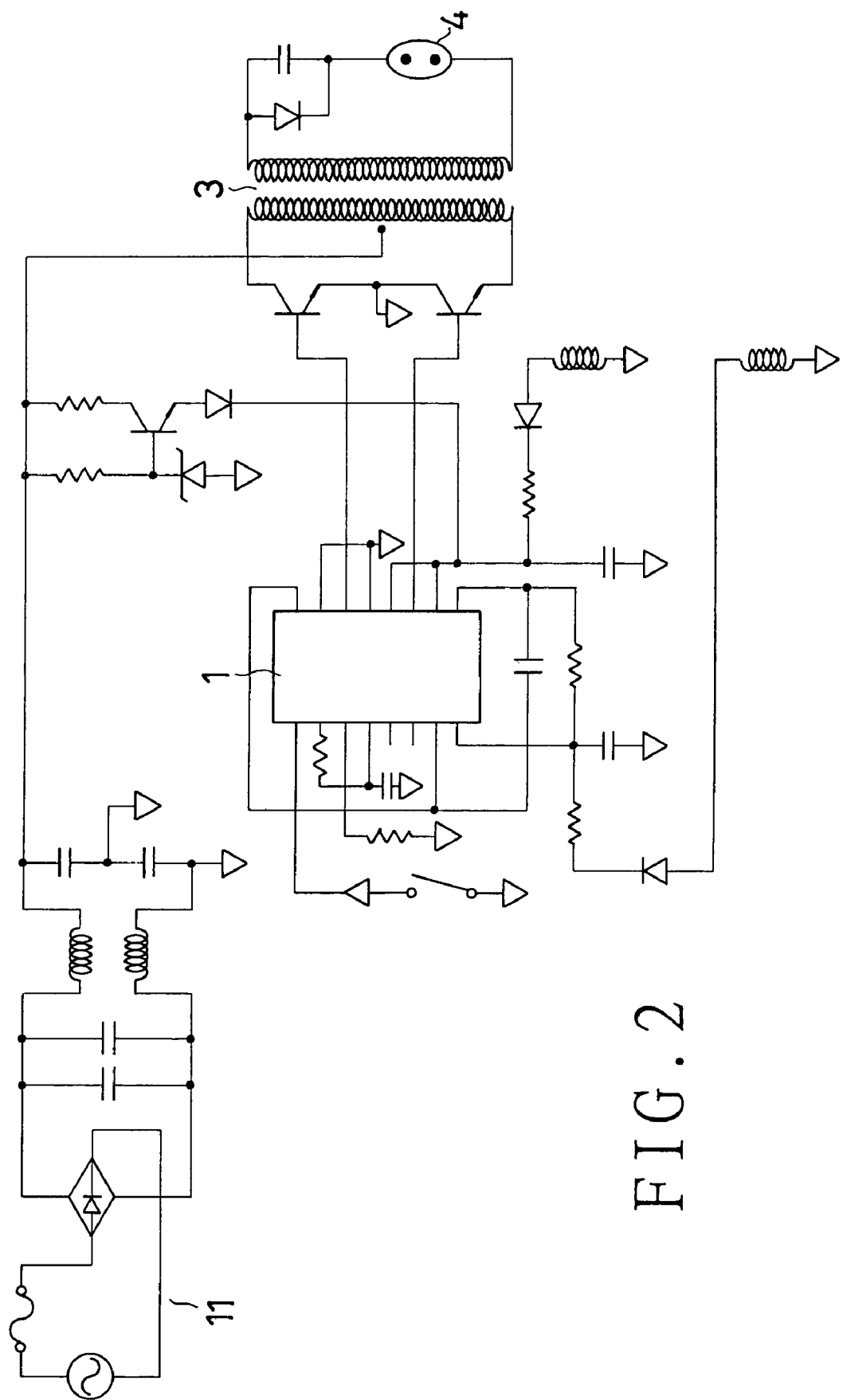
FIG. 2 is a circuit diagram of the high-efficiency controller of a gas-filled tube according to the present invention.

Referring to FIGS. 1, and 2, a preferred embodiment of a high-efficiency controller of a gas-filled tube in the present invention includes a logic integrated circuit controlled and oscillated by the pulse width modulation 1 (P.W.M.), which is connected to a power source 11 at an input terminal thereof in order to input the direct current power source or the same transformed by the alternative current power source, and is electrically connected to an external switch circuit 12. An output terminal of the logic integrated circuit controlled and oscillated by the pulse width modulation 1 is connected to a power amplifying circuit 2. An output terminal of the power amplifying circuit 2 is electrically connected to a transformer 3, which is connected to a subsidiary power circuit 5, an overload protective circuit 6, an idle disconnection circuit 7, and a grounding protective circuit 8 at an output terminal thereof besides a load 4 such a gas-filled light producing tube. Other end terminals of the subsidiary power circuit 5, the overload protective circuit 6, the idle disconnection circuit 7, and the grounding protective circuit 8 are connected to the logic integrated circuit controlled and oscillated by the pulse width modulation 1.

When the present invention is being used, direct electric current is supplied to the logic integrated circuit controlled and oscillated by the pulse width modulation 1 from the power source 11, and in turns, the logic integrated circuit controlled and oscillated by the pulse width modulation 1 transforms the direct electric current into signals in the form of output of high-frequency sine wave (1.414). Then, power is amplified with the power amplifying circuit 2 according to voltage-drive technology, and is transformed into currents having such voltages as to be able to soft-start the load 4 for the load 4 to emit light by means of the transformer 3, which is in the form of high frequency, high efficiency and low magnetic loss level. Consequently, the controller is highly efficient in respect of saving of power, and can prevent occasional big currents that last for relatively short time from forming, and can help the load, e.g. a gas-filled light producing tube, to be more stable and have a long lifespan for using.

In addition, because subsidiary power circuit 5 is connected to both the logic integrated circuit controlled and oscillated by the pulse width modulation 1 and the transformer 3, which is in the form of high frequency, high efficiency and low magnetic loss, power can be supplied from the transformer 3 to the logic integrated circuit controlled and oscillated by the pulse width modulation 1. The overload protective circuit 6 is connected to both the logic integrated circuit controlled and oscillated by the pulse width modulation 1 and the transformer 3 so that the overload protective circuit 6 can make the logic integrated circuit controlled and oscillated by the pulse width modulation 1 stop working if the load 4 breaks or the output of the transformer 3 short-circuits, thus, reducing the danger. The idle disconnection circuit 7 can make the logic integrated circuit controlled and oscillated by the pulse width modulation 1 stop working if power of the transformer 3 is cut off or in idle motion, thus also preventing danger. And, the grounding protective circuit 8 can make the logic integrated circuit controlled and oscillated by the pulse width modulation 1 stop working if the output terminal of the transformer 3 contacts the ground or human body comes into contact with the output terminal of the transformer 3, thus making the controller safer to use. The external switch circuit 12 is connected to an input terminal of the logic integrated circuit controlled and oscillated by the pulse width modulation 1, and can be connected to various controlling device such as voice-controlled one, light-controlled one and so on for controlling the logic integrated circuit controlled and oscillated by the pulse width modulation 1.

From the above description, it can be easily understood that the high-efficiency controller of a gas-filled light producing tube according to the present invention can make a gas-filled light producing tube relatively safe and economical to use with a long lifespan for using.

What is claimed is:

1. A high-efficiency controller of a gas-filled light producing tube, comprising:
    a logic integrated circuit controlled and oscillated using pulse width modulation for transforming direct electric current supplied from a power source into output signals in a form of high-frequency sine waves;
    a power amplifying circuit formed by a pair of transistors respectively coupled to a pair of outputs of the logic integrated circuit to provide a push-pull configuration;
    a transformer electrically connected to a pair of outputs of the power amplifying circuit for supplying current and voltage as needed by a load; and
    a plurality of protective circuits coupled between the transformer and logic integrated circuit, at least one of the protective circuits being operable to shut down the logic integrated circuit responsive to an operational condition of the transformer.

2. The high-efficiency controller of a gas-filled light producing tube as claimed in claim 1, wherein the load is a gas-filled light producing tube.

3. The high-efficiency controller of a gas-filled light producing tube as claimed in claim 1, wherein an overload protective circuit is connected to both the logic integrated circuit and the transformer for shutting down the logic integrated circuit responsive to an occurrence of an overload.

4. A high-efficiency controller of a gas-filled light producing tube, comprising:
    a logic integrated circuit controlled and oscillated using pulse width modulation for transforming direct electric current supplied from a power source into output signals in a form of outputs of high-frequency sine waves;
    a power amplifying circuit coupled to an output of the logic integrated circuit;
    a transformer electrically connected to an output of the power amplifying circuit for supplying current and voltage as needed by a load; and,
    a subsidiary power circuit connected to both the logic integrated circuit controlled and oscillated by the pulse width modulation and the transformer for loop-supplying continuously power to the logic integrated; and
    a plurality of protective circuits coupled between the transformer and logic integrated circuit, at least one of the protective circuits being operable to shut down the logic integrated circuit responsive to an operational condition of the transformer.

5. A high-efficiency controller of a gas-filled light producing tube, comprising:
    a logic integrated circuit controlled and oscillated using pulse width modulation for transforming direct electric current supplied from a power source into output signals in a form of high-frequency sine waves;
    a power amplifying circuit formed by a pair of transistors respectively coupled to a pair of outputs of the logic integrated circuit to provide a push-pull configuration; and
    a transformer electrically connected to a pair of outputs of the power amplifying circuit for supplying current and voltage as needed by a load;
    wherein an idle disconnection circuit is connected to both the logic integrated circuit and the transformer for shutting down the logic integrated circuit responsive to an occurrence of one of a condition of power of the transformer being cut off and a condition of the transformer being in idle motion.

6. The high-efficiency controller of a gas-filled light producing tube, comprising:
    a logic integrated circuit controlled and oscillated using pulse width modulation for transforming direct electric current supplied from a power source into output signals in a form of outputs of high-frequency sine waves;
    a power amplifying circuit coupled to an output of the logic integrated circuit;
    a transformer electrically connected to an output of the power amplifying circuit for supplying current and voltage as needed by a load; and,
    a grounding protective circuit connected to both the logic integrated circuit and the transformer for shutting down the logic integrated circuit responsive to an occurrence of one of a grounding condition and contact with a human body.

* * * * *